(12) United States Patent
Walzman et al.

(10) Patent No.: US 11,173,849 B2
(45) Date of Patent: Nov. 16, 2021

(54) DASHBOARD TISSUE HOLDER

(71) Applicants: Akiva Walzman, Bergenfield, NJ (US); Daniel Ezra Walzman, Bergenfield, NJ (US)

(72) Inventors: Akiva Walzman, Bergenfield, NJ (US); Daniel Ezra Walzman, Bergenfield, NJ (US)

(73) Assignee: Akiva Walzman, Bergenfield, NJ (US)

( * ) Notice: Subject to any disclaimer, the term of this patent is extended or adjusted under 35 U.S.C. 154(b) by 0 days.

(21) Appl. No.: 15/732,322

(22) Filed: Oct. 24, 2017

(65) Prior Publication Data

US 2018/0126913 A1 May 10, 2018

Related U.S. Application Data

(60) Provisional application No. 62/497,110, filed on Nov. 7, 2016.

(51) Int. Cl.
*G10L 15/22* (2006.01)
*G10L 25/51* (2013.01)
*B60R 7/08* (2006.01)

(52) U.S. Cl.
CPC .............. *B60R 7/084* (2013.01); *G10L 15/22* (2013.01); *G10L 25/51* (2013.01); *G10L 2015/223* (2013.01); *G10L 2015/227* (2013.01)

(58) Field of Classification Search
CPC ......... B60R 7/084; G10L 15/22; G10L 25/51; G10L 2015/223; G10L 2015/227
USPC ........................................................ 704/275
See application file for complete search history.

(56) References Cited

U.S. PATENT DOCUMENTS

| 4,648,530 A * | 3/1987 | Granger | A47K 10/34 221/155 |
| 6,069,354 A * | 5/2000 | Alfano | A47K 10/36 242/563 |
| 7,527,215 B1 * | 5/2009 | Siddiqui | A47K 10/36 225/10 |
| 9,756,992 B2 * | 9/2017 | Osborne, Jr. | A47K 10/3625 |
| 2005/0167541 A1 * | 8/2005 | Osborne | B65H 16/005 242/563 |
| 2006/0197353 A1 * | 9/2006 | Hanzel | B60R 11/00 296/37.12 |
| 2006/0206379 A1 * | 9/2006 | Rosenberg | G06Q 30/02 705/14.54 |
| 2011/0199182 A1 * | 8/2011 | Catlin | B60N 3/106 340/5.7 |
| 2013/0140842 A1 * | 6/2013 | Sakai | B60Q 3/225 296/37.12 |
| 2014/0142949 A1 * | 5/2014 | Newman | G10L 15/26 704/275 |

(Continued)

*Primary Examiner* — Richemond Dorvil
*Assistant Examiner* — Rodrigo A Chavez

(57) ABSTRACT

A control system is operable within a host vehicle to control the operation of signaling apparatus indicative of a driver intent to present a tissue box. The current invention permits the activation of an electro-mechanical system located proximally to said driver to permit access to a tissue. The control system includes a voice recognition circuit for activating a panel signal devices within the vehicle. In some embodiments, a wireless link facilitates aftermarket applications while in other embodiments original equipment manufacturer is accommodated. In some embodiments the tissue panel is opened manually.

8 Claims, 3 Drawing Sheets

(56) References Cited

U.S. PATENT DOCUMENTS

| | | | | |
|---|---|---|---|---|
| 2014/0180474 A1* | 6/2014 | Soares | ................... | G07F 9/001 |
| | | | | 700/236 |
| 2014/0350427 A1* | 11/2014 | Holder | .............. | A61M 16/0051 |
| | | | | 600/529 |
| 2015/0021325 A1* | 1/2015 | Shek | ................... | A47K 10/421 |
| | | | | 220/211 |
| 2016/0200547 A1* | 7/2016 | Nagata | ................... | B66B 1/468 |
| | | | | 187/380 |
| 2017/0013188 A1* | 1/2017 | Kothari | ................... | B60R 1/00 |

* cited by examiner

DASHBOARD TISSUE HOLDER

CROSS-REFERENCES

This is a non-provisional utility application claiming priority to the provisional application Ser. No. 62/497,110 filed Nov. 7, 2016

BACKGROUND OF THE INVENTION

Field of the Invention

The present disclosure relates to a safety systems for vehicles, primarily passenger vehicles, comprising automated tissue dispensing system located proximally to the driver of said vehicles designed to prevent driver distraction and associated accidents.

Background Art

The present invention is a tool to dispense tissue safely to vehicle operators. Tissue boxes are often not accessible to vehicle operators when operating a vehicle. This is particularly true when the vehicle operator is alone and need one. Can be dangerous to the vehicle operator and others if said operator is distracted looking for a tissue box and/or fumbles the tissue box while operating the vehicle and attempting to reach it.

Advantages of the Current Invention

The present invention substantially fulfills the forgoing unmet needs. The dashboard is ideal spot. The present invention includes a panel that lifts, retracts or combination, to expose a tissue box, thus allowing easy access to the vehicle operator. The present invention allows a tissue box to lift or retract manually or electronically—in some cases to voice commands (i.e., "tissue please") and/or to the system "hearing" a sneeze thus allowing the vehicle operator timely access to a box of tissue even when driving alone.

The current invention can be differentiated from an automatic tissue dispenser apparatus such as U.S. Pat. No. 7,527,215 to Zafar A. Siddiqui (for an Automatic tissue dispenser apparatus). The Siddiqui structure includes bars for holding rolls of tissue, a cutting element and motion sensor. The present invention requires none of these elements. The present invention uses precut tissues thus eliminating the need for a bar for holding rolls of tissues and a cutting element. The present invention use a voice or pressure activation rather than motion sensors to activate the tissue dispenser system.

The present invention may be differentiated from U.S. Pat. No. 9,756,992 B2 to Charles Andrew Osborne, Jr. (for an electronic residential tissue dispenser) for similar reasons base on structure. Osborne teaches an electronic tissue dispensing systems for perforated flexible sheet material. The present invention teaches dispensing precut tissues.

Maurice Granger U.S. Pat. No. 4,648,530 (entitled Automatic dispenser of pre-cut and Z-wrapped or folded web materials) teaches an automatic dispenser for precut Z-folded web materials wherein the dispenser comprises a holder or support having an orifice through which the web materials are pulled. The orifice has outwardly rounded edges so that the web can be pulled with unequal pulling forces and from different directions. The present invention does not have the orifice element for separating the precut tissue. Rather the present invention relies on the inter-leafing packaging of the precut tissue for separating of one tissue from another.

BRIEF DESCRIPTION OF THE DRAWINGS

The invention will be better understood and objects other than those set forth above will become apparent when consideration is given to the following detail description thereof. Such description makes reference to the annexed drawings wherein.

DETAILED DESCRIPTION OF THE INVENTION

Figure 1:
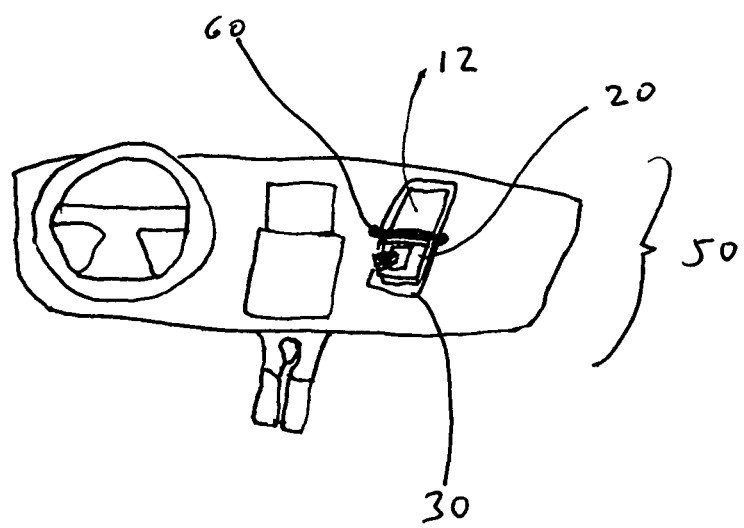
FIG. 1 is a depiction of the current invention in situ on a vehicle dashboard.

The present disclosure teaches a dashboard tissue holder. The present invention is built into a car. With reference to FIG. 1, the current invention 10 may be built into the dashboard assembly 50 of a vehicle (not shown); alternatively it may be disposed in seat backs, doors, and/or arm rests for convenience. In the preferred embodiment, the present invention includes a sound collection device capable of detecting sneezes and of hearing voice commands related to access to a tissue box 20. located in receptacle 30. Tissue box 20 is covered by panel 12 connected to receptacle 30, preferably by lift mechanism 60 when in closed position. In the preferred embodiment, panel 12 is motorized. FIG. 1 depicts the current invention in an open position.

Figure 2:
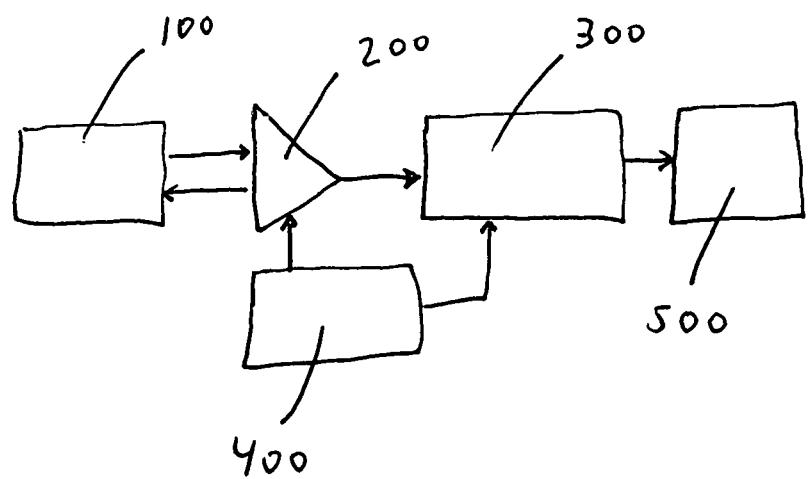
FIG. 2 is a diagram showing the connectivity of the major components of the sound processing system of the current invention.

Referring now to FIG. 2, said sound collection device, a microphone in the preferred embodiment, is located on dashboard 50. Sound collection device may be placed in any convenient location capable of detecting a sneeze or voice command, including cell-phones or o other mobile devices proximate to vehicle occupants, which said alternate collection device needs to be capable of collecting sound, fetching control information, and signaling lift mechanism 60 attached to receptacle 30.

Continuing to refer to FIG. 2, in the preferred embodiment, a sound processing system comprises a microphone 100, a sound-input filter 200, a digital processing device such as a computer 300, in the preferred embodiment, a power source such as a battery 400 in the preferred embodiment, and an output-signal controller 500. Microphone 100 is capable of two-way communication with input filter 200. Said filter 200 is in communication with computer 300, both of which are powered by electric power source 400. In the preferred embodiment, power received by filter 200 is transferred to microphone 100 by filter 200. Computer 300 communicates with output signal controller 500 and transmits power to controller 500. Controller 500 is in communication with lift mechanism 60.

Figure 3:
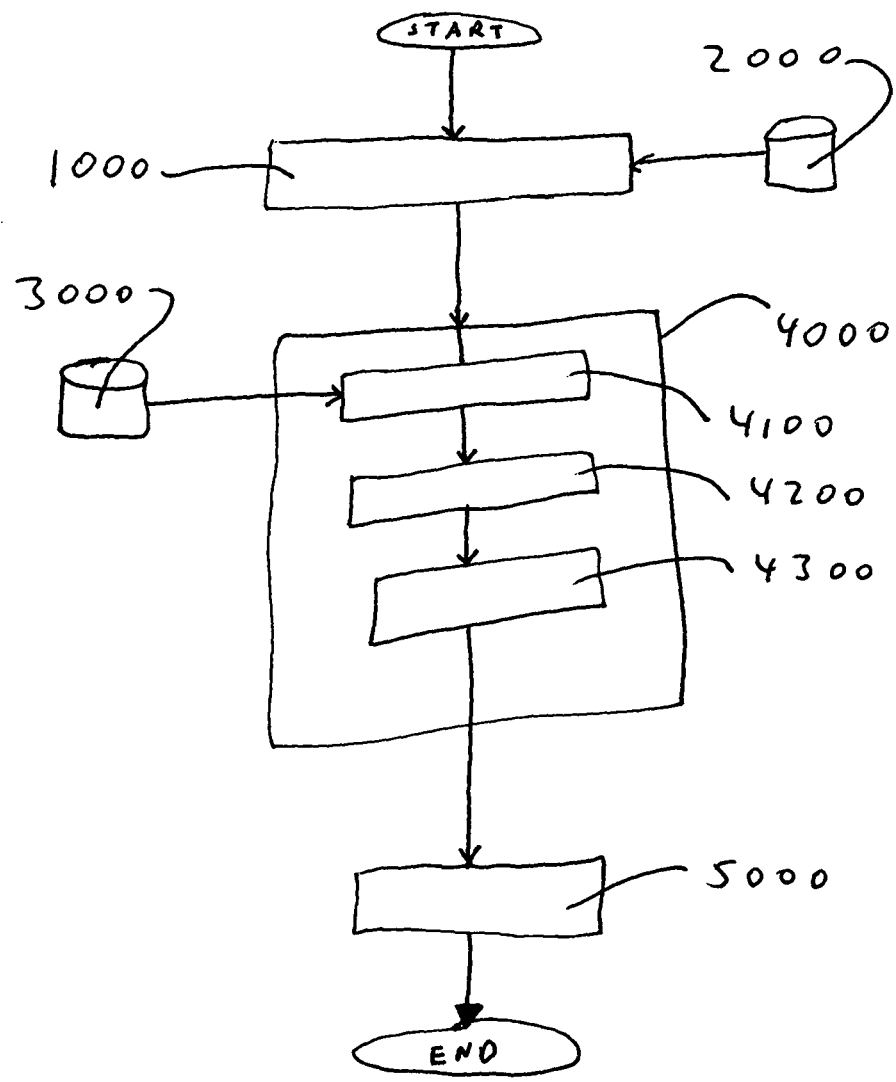
FIG. 3 is a flowchart of the control steps of digital processor 300 to actuate the current invention.

In the preferred embodiment, the sound processing system (FIG. 2) which contains elements connected to and capable of sending digital information regarding said collected sound to a computer 300 capable of running software for decoding sound (FIG. 3). Computer 300 is proximately connected to and capable of sending a signal to lift mechanism 60 that raises, retracts or a combination thereof, to expose a tissue box 20, thus allowing easy access to the vehicle operator. The present invention is capable of either holding a preset size of tissues without a box, or a certain size box 20.

With respect to FIG. 3, a flowchart of software running in computer 300 is depicted. Said software is initiated by a signal from input filter 200. Upon receipt of said signal, a voice recognition subroutine 1000 communicates with a voice-command table 2000. Voice-command table 2000 is capable of identifying voice commands and various sounds signaling a sneeze or cough. The output from voice-recognition 1000 is communicated to signal-generator 4000. Signal-generator 4000 uses fetch-control information subroutine 4100 to compare input from voice-recognition 1000 with instructions in appliance-control table 3000. Appliance-control table 3000 is capable of associating appropriate lift mechanism 60. Output from fetch-control information subroutine 4100 is communicated to the generate-and-output control signal subroutine 4200. Generate-and-output control signal subroutine 4200 sends a signal to receive-control result subroutine 4300. Receive-control result subroutine 4300 confirms the appropriateness of the signal and generates an additional signal to the output subroutine 5000. Output subroutine 5000 activates lift mechanism 60.

In a preferred embodiment signal-generator 4000 can open the present invention panel 12 due to a sneeze, cough, voice command. In a preferred embodiment signal-generator 4000 can close panel 12 by a voice command. Additionally, signal-generator 4000 can nullify signals due to coughs or sneezes if these occur within a defined period. In the preferred embodiment, signal-generator 4000 will ignore all sneeze and cough sounds occurring within fifteen seconds of any other cough or sneeze. This prevents unwanted activation of lift mechanism 60 during a short series of repeated coughs or sneezes.

The control system 4000 in some variations of the present invention include a voice recognition circuit for signaling the lift mechanism 60 in multiple receptacles 30. In some embodiments, a wireless link facilitates aftermarket applications while in other embodiments original equipment manufacturer is accommodated.

What is claimed is:

1. For use in a vehicle, a voice sneeze operated signal system comprising:
   at least one receptacle built into to a dashboard of a vehicle and accessible by an operator of the vehicle during operation thereof, the receptacle containing a tissue box having a plurality of pre-cut tissues, the receptacle containing a motorized panel connected to the receptacle by a lift mechanism;
   wherein the motorized panel lifts to expose the tissue box of precut tissues and is openable and closable, and
   a sound collection device including a microphone for converting audible information to signals, the microphone located on the dashboard;
   wherein said audible information is a sneeze and wherein no prompt is provided to the user prior to receiving said audible information,
   a digital processing device with embedded software capable of decoding
   signals of the sneeze comprising:
the sound-collection device for receiving a frame of sound samples and extracting a set of parameters for sound recognition;
   software for decoding sounds collected by said sound-collection device, and for converting said sound from said parameters in accordance with a voice command table;
   and producing activation signals corresponding to said sneeze; and
   a application control table selectively activating said motorized panel, to expose the receptacle containing the tissue box of precut tissues for manual extraction of the precut tissues by a user in response to said activation signals, the motorized panel activated without motion by the user other than a sneeze;
   wherein the software of the system processes a first activation signal of a first sneeze to open the panel and nullifies a second activation signal of a second sneeze if it occurs within a defined period to prevent unwanted opening of the panel.

2. The signal system set forth in claim 1 wherein said sound recognition includes voice commands, each including a command word common to all of said voice commands and wherein said voice recognition system activates said motorized panel to perform at least one of lifting and retracting of the motorized panel of the said receptacle.

3. The signal system set forth in claim 1 wherein said activation signals are manually generated.

4. The signal system set forth in claim 1 wherein said sound collection device further detects a cough.

5. The signal system set forth in claim 1, wherein the pre-cut tissues are contained in interleafing packages for separating the tissues.

6. The signal system set forth in claim 2, wherein the pre-cut tissues are contained in interleafing packages for separating the tissues.

7. The signal system set forth in claim 1, wherein the receptacle is devoid of a cutting element.

8. The signal system set forth in claim 1, wherein the panel is openable and closable by voice commands.

* * * * *